July 15, 1952 R. L. HUBER 2,603,032
SOAP CAKE COVER
Filed May 29, 1948
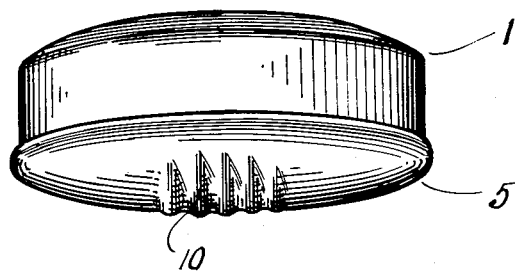
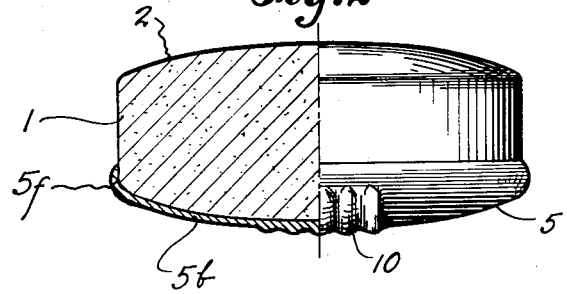
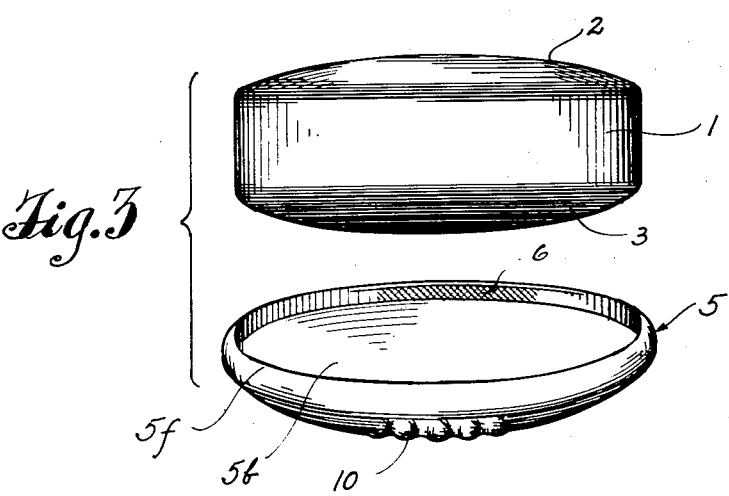
INVENTOR.
RALPH L. HUBER
BY
Cook & Robinson
ATTORNEYS Patented July 15, 1952

2,603,032

UNITED STATES PATENT OFFICE 2,603,032

SOAP CAKE COVER

Ralph L. Huber, Seattle, Wash.

Application May 29, 1948, Serial No. 30,082

2 Claims. (Cl. 45—28)

This invention relates to soap cake covers or shields. More particularly, it has reference to protective covers designed for application to existing soap cakes of definite form to protect the cake from waste and against the softening action of water that may drain from the wet soap cake onto a surface or support upon which the cake is rested after use.

It is the principal object of this invention to provide a soap cake cover of the above stated character, designed to receive one side portion of a soap cake therein with form fitting closeness, and to be retained against displacement therefrom by reason of its form fitting character; said cover being so designed that when applied in its intended manner, it will leave a major portion of the surface of the soap cake exposed, and will permit the latter to be handled and used in the usual manner for soaping the hands, without interference by reason of its application.

It is a further object of the invention to provide a cover member of a sanitary character; the use of which will result in the saving of soap; which will prevent the soap cake from getting soft or slimy, and objectionable to handle, and which, by reason of the provision of certain surface irregularities or corrugations, can be used as a scrubbing aid.

Still further objects of the invention are incident to the provision of novel details of construction which insure the securement of the cover on the soap cake without requiring that it be equipped with hooks or protuberances designed to be embedded in the soap cake.

In accomplishing the above mentioned and other objects of the invention, I have provided the improved details of construction, the preferred forms of which are illustrated in the accompanying drawings wherein:

Fig. 1 is a perspective view of a cake of soap equipped with a soap saving cover or shield embodied by the present invention.

Fig. 2 is a longitudinal sectional view of the cake of soap with cover applied.

Fig. 3 is a view showing the soap cake and cover in separated relationship for better understanding of details of the latter.

Referring more in detail to the drawings:

1 designates a cake of soap that has been formed or molded to a definite oval form. As shown in Fig. 3, the cake has uniformly outwardly rounded top and bottom surfaces and substantially vertical side and end surfaces. The cover or shield embodied by the present invention is designated in its entirety by reference numeral 5, and in Fig. 3 it is shown separated from the soap cake.

The cover 5 may be made of plastic, metal or other suitable material, but plastic is preferred and this would be molded over a matrix of the same shape as that part of the soap cake to which it is to be applied. It is characterized by the fact that when so made it will receive one side portion of the soap cake therein, as illustrated in Fig. 2, with such form fitting closeness that this condition operates to hold the soap cake and cover against separation even under most drastic conditions of use.

The cover 5, as noted best in the cross-sectional view, has walls that are quite thin, but this is not necessarily so, and is formed with a bottom 5b about the periphery of which is an upstanding flange 5f. The outside surface of the flange 5f is rounded into the under surface of the bottom in a smooth corner as best shown in Fig. 2, and is also rounded into a thin edge along the top of the flange 5f, thus to eliminate all ridges or corners and abrupt turns that would tend to make the soap cake difficult to be turned or tossed in the hands as is customary in soaping the hands.

The inside surfaces of the flange 5f and bottom of the cover are so shaped that the soap cake can be readily pressed into the cover and will be received in a close fit, without permitting any intervening air pockets, spaces or cracks into which water could seep and destroy the holding property of the close fit. The form fitting character of the cover is of the essence of the invention, for in this detail resides the property of sealing the device against water leakage and of holding the cover in place without the necessity of flanges, hooks or other means to be embedded in the soap cake either by pressure or by reason of originally casting the soap cake therein. To better insure the holding effect of the flange 5f, this may have its inner surface corrugated, roughened, or knurled as indicated at 6 in Fig. 3. This roughened surface should not, however, extend to the peripheral edge of the flange since that might be detrimental to the sealing effect.

The form fitting feature makes it possible also to use the soap cake with cover applied with the same ease and feeling of a moistened cake of soap, without the user being conscious of its presence.

As an added feature, the cover is formed centrally of the bottom portion with a corrugated area, as designated at 10 which, if rubbed back and forth over the surface being washed, will create a vibration like that produced by a washboard, thus helping considerably in the cleansing function of the soap. In lieu of corrugations, an advertising inscription or design might be applied to obtain the same results.

To apply a cake of soap to the cover, or vice versa, it is only necessary to moisten the surface of the cake to which the cover is to be applied, and press it into the cover between the flanges 5f and to firmly seat it against the bottom 5b. This will exclude all air and water from between the parts. The roughened surface 6 insures better holding.

When the cover is so applied to the cake of soap, it will be apparent that after use of the soap as in washing the hands, if it is placed on a support with cover side down, water will drain therefrom and the cake will be allowed to dry. Further soap saving may be realized when placing a new cake of soap in the soap saver. The old remnant, having first been removed from the cover, may be moistened and applied on top of the new soap cake. This is then secured and adapted to conformity by placing a towel over the assembled cake and holder and tightly twisting the gathered ends of the towel; thusly there is no soap loss other than normal functional use.

Size and shape of the cover and material used in making it are not material so long as the cover is designed for form fitting application to the soap cake as illustrated. In this respect there is a distinction between the present combination of cake and cover, designed for eliminating air pockets, open cracks or leaks, by their assembly, and those combinations wherein the soap is originally molded into a cake within the cover, and securement of the latter is by reason of inturned flanges, prongs or ridges formed in the cover and which eliminate possibility of re-use or reapplication of the cover to other soap cakes.

While I have shown the present device only in one particular form and designed to fit a soap cake of one definite form only, it is to be understood that soap cakes of other shapes, for instance square, angular or otherwise, might be equipped with covers of this particular kind made either of metal or of plastic. The best results are obtained when the side walls of the soap cake are vertical, as herein shown but it is also possible to use such shields on soap cakes that have rounding side walls, so long as a good sealing effect between flange 5 and the soap cake is made possible.

Having thus described my invention, what I claim as new therein and desire to secure by Letters Patent is:

1. A soap cake cover plate comprising a bottom of such configuration as to intimately contact a preformed cake of soap received therein, said bottom having an upstanding flange integrally extending therefrom, and conforming to a vertical peripheral edge portion of the cake of soap, the contact between the cover plate and the surface of the soap cake received therein being of an intimate sealing nature and such that the cake of soap can be held by the cover plate, the outer surface of said flange being rounded gradually and smoothly from the under surface of said bottom and tapering to a thin edge at the peripheral top of said flange, said thin edge merging into the plane of said inside surface and adapted to engage the vertical surface of the preformed cake of soap, thereby providing a relatively smooth surfaced cover plate free of sharp edges when holding a cake of soap.

2. A soap cake cover plate as recited in claim 1, wherein the inside surface of said flange includes a smooth narrow band adjacent the upper thin edge, and a knurled portion below said smooth narrow band.

RALPH L. HUBER.

REFERENCES CITED

The following references are of record in the file of this patent:

UNITED STATES PATENTS

| Number | Name | Date |
| --- | --- | --- |
| 680,052 | Lynch | Aug. 6, 1901 |
| 702,531 | Bowen | June 17, 1902 |
| 1,073,921 | Morgan | Sept. 23, 1913 |
| 1,221,939 | Wirth | Apr. 10, 1917 |
| 1,332,096 | Applegate | Feb. 24, 1920 |
| 1,571,842 | Labry | Feb. 2, 1926 |

FOREIGN PATENTS

| Number | Country | Date |
| --- | --- | --- |
| 513,217 | Great Britain | Oct. 6, 1939 |
| 712,504 | France | July 21, 1931 |
| 789,025 | France | Aug. 5, 1935 |